United States Patent Office

3,580,806
Patented May 25, 1971

3,580,806
PRESSURE SUPPRESSING ARRANGEMENT
Sterling J. Weems, Chevy Chase, and I. Harry Mandil, University Park, Md., assignors to Westinghouse Electric Corporation, Pittsburgh, Pa.
Filed Apr. 5, 1968, Ser. No. 719,054
Int. Cl. G21c 13/00
U.S. Cl. 176—37                              5 Claims

ABSTRACT OF THE DISCLOSURE

A nuclear steam generating plant is disclosed which is enclosed within a containment structure which employs the melting of a solid material such as ice for pressure suppression and heat absorption purposes. An annular diffuser section is situated beneath an annular solid material containing compartment to prohibit excess coolant escaping from the reactor after an accident from overloading and channeling through vertical sections of the meltable solid. The diffuser section comprises a plurality of liquid traps which act as valves, i.e., each trap fills with liquid and is essentially sealed after a rated load of escaping coolant has melted a portion of the vertical section of solid material above it to ensure the exposure of other sections of solid material to the escaping coolant.

BACKGROUND OF THE INVENTION

This invention pertains to nuclear reactor containment arrangements, and more particularly to a diffuser for prohibiting overloading and channeling of escaping coolant through sections of a reactor containment structure employing a meltable solid for coolant pressure suppression.

Recently, a reactor containment arrangement employing meltable solid materials has been devised to protect against vapor escaping from a nuclear steam generating plant under accident conditions. This protective ararngement may essentially comprise a containment system divided into three compartments: a lower compartment containing the nuclear steam generating system; an upper compartment separated from the lower compartment by an operating deck; and an annular pressure suppression compartment containing meltable solid material which connects with the upper and lower compartments through pressure actuated doors. A break in the steam generating system causes the pressure to rise in the lower compartment which forces numerous doors open to allow ingress of air and vaporized coolant into the pressure suppression compartment. The vapor enters vertical passages bounded by a meltable solid material and is condensed. The pressure increase which normally results from a break in the steam generating system is thereby minimized and the size, strength and cost of the containment structure is accordingly reduced.

Depending on the amount of solid material provided in a particular design, and the degree of non-uniformity of energy flow into different sections of the pressure suppression compartment certain accidents might partially negate the operation of the above pressure suppression system by overloading one or more vertical sections of solid material and causing a vapor channel to form therethrough. This would allow escaping vaporized coolant to flow unimpeded to the upper compartment perhaps causing an over-pressure situation to exist.

SUMMARY OF THE INVENTION

The problem of making certain that all sections of the solid material are insured against overloading and channeling is solved by providing a diffuser at the bottom of the substantially annular solid material containing compartment.

The diffuser section comprises a plurality of liquid trap valves which will close-off the inlet port to that section of solid material after that section has received a rated amount of escaping vaporized coolant. Such an expedient ensures that a differential pressure will be produced sufficient to cause vaporized coolant to flow to other sections of solid material which have not yet received their rated load of the escaping coolant.

Each liquid trap valve essentially consists of a two compartment container which is open to the ingress and will contain a liquid. An opening is provided between the compartments which allows a fluid to pass from one compartment to the other until an incoming liquid fills it to a level above the opening and seals the compartments from each other.

When associated with solid material containing sections of a pressure suppression system, each liquid trap valve is directly responsive to the volume of escaping reactor coolant vapor passing therethrough in that the rate at which the valve fills with liquid formed by the melted solid and condensed coolant is directly dependent upon the rate at which the solid melts which is in turn dependent upon the amount of escaping coolant passing through the valve.

It should be further noted that such a liquid actuated valve performs a further safety function in that it is sealed only for a particular range of pressures. Assuming that all the liquid trap valves have "closed," it is still possible for excess steam to escape by overcoming the head of liquid in the valves. Although such an event is very unlikely, the relative-sealing function performed adds a further measure of safety to this system over, for example, a system where each door was positively closed after a rated amount of escaping reactor vapor had been sensed to have passed therethrough. Moreover, foolproof operation of the liquid trap valve of this invention is assured in that it has no moving parts.

A more detailed understanding of the invention may be had by reference to the accompanying drawings, in which.

DESCRIPTION OF THE PREFERRED EMBODIMENT

Figure 1:
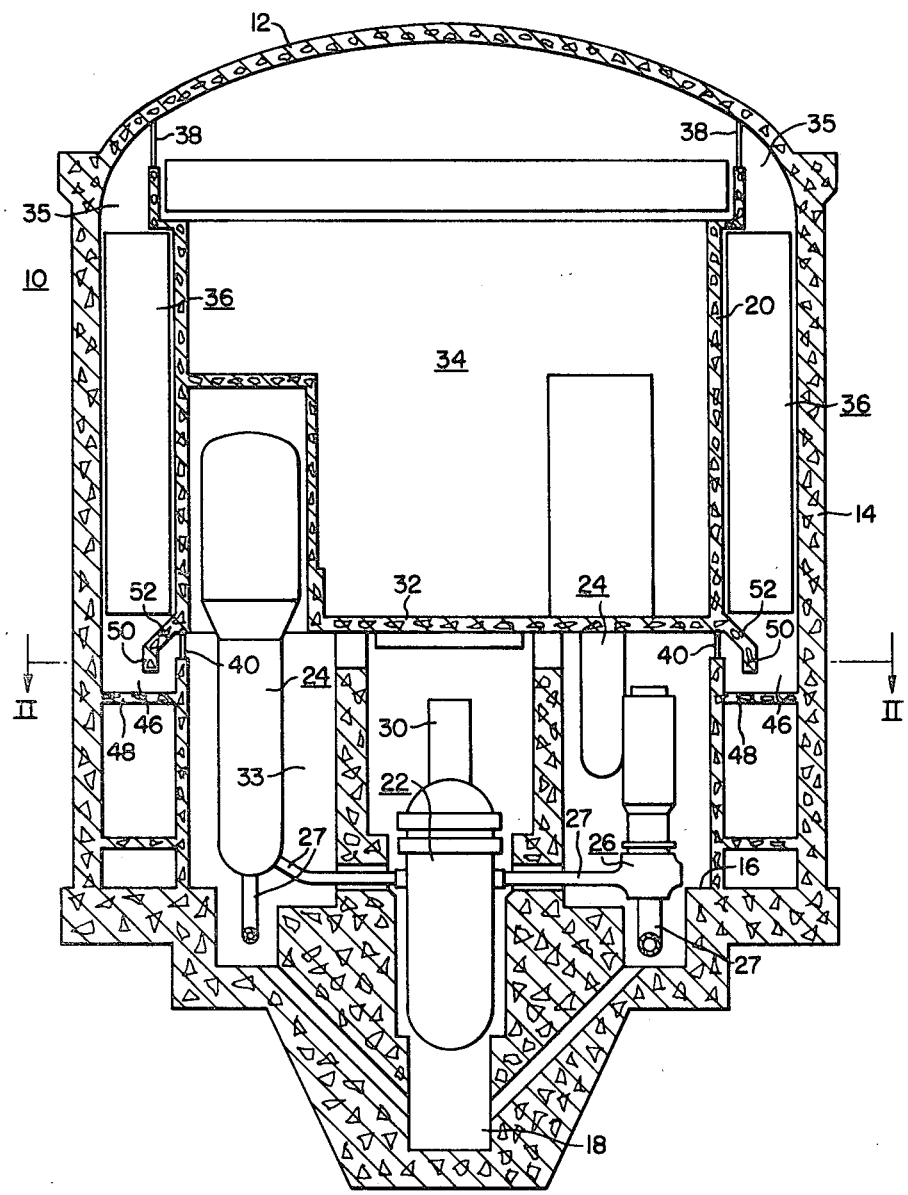
FIG. 1 shows a schematic sectional elevation view of the pressure suppression containment system employing a meltable solid as improved in accordance with this invention.
Figure 2:
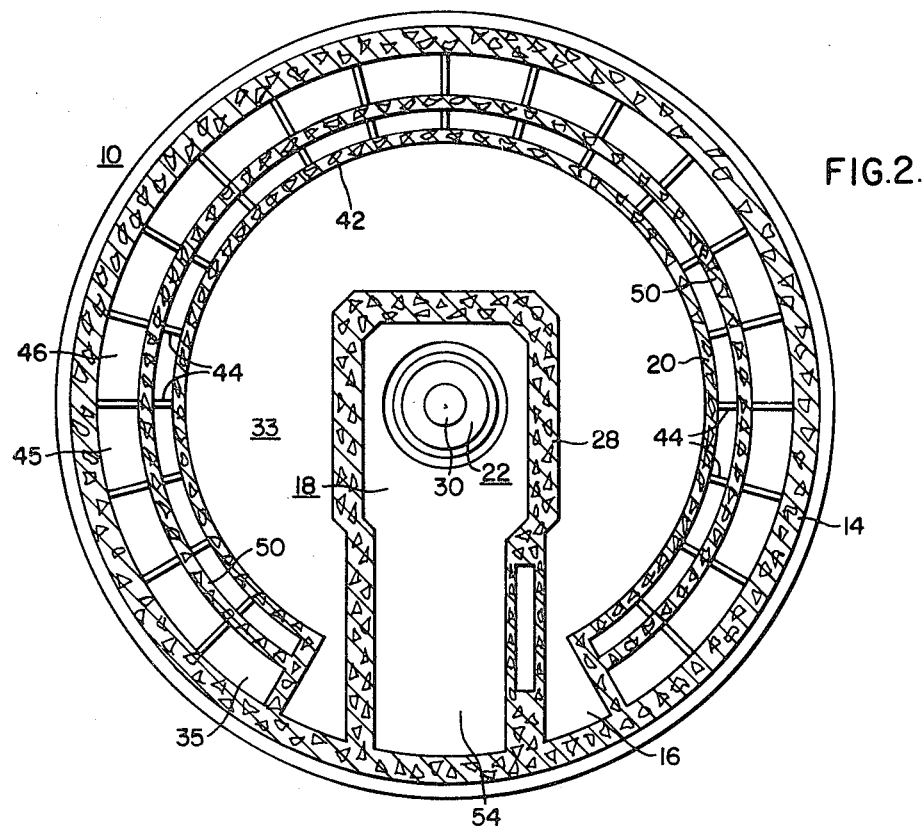
FIG. 2 is a schematic sectional view taken along line II—II of FIG. 1.

Referring to FIGS. 1 and 2, an illustrative arrangement of an improved pressure suppressing system for use with a nuclear steam generating plant is depicted therein. The system shown is an improvement on that described in detail in a copending application Ser. No. 528,639, filed Feb. 18, 1966, now Pat. No. 3,423,286, by S. J. Weems, J. A. Hinds and I. H. Mandil for a Pressure Suppressing Arrangement, and assigned to the present assignee. The reactor containment 10 comprises a head portion 12, a cylindrically shaped vertical wall portion 14, and a circular floor 16 which has a reactor well 18 therein.

Spaced inwardly from and essentially parallel with the vertical wall portion 14 is a vertical and substantially annularly shaped seconndary shield or wall 20. The shield 20 extends from the floor 16 to the upper region of the space encompassed by the containment 10.

The nuclear steam generating apparatus is located within the secondary shield 20. The apparatus comprises a nuclear reactor vessel 22 supportedly suspended within the well 18, and several steam generating loops; each of which may include a heat exchanger such as steam generator 24, a primary coolant pump 26, and primary coolant conduits 27. In operation, the primary coolant is heated within the nuclear reactor vessel 22, flows from the reactor vessel 22 to the steam generators 24 wherein a portion of the heat content is transferred to a secondary fluid, flows from the steam generators 24 to the pumps 26, and then returns to the reactor vessel 22 and the cycle is repeated. A pressurizer (not shown) is coupled to one of the loops to maintain a certain range of pressure within the reactor primary system.

Spaced inwardly of the secondary shield 20, the steam generators 24, and coolant pumps 26 is a primary shield 28 which extends vertically from the floor 16 and surrounds the uppermost portion of the nuclear reactor vessel 22 and its control mechanism housing 30. The primary shield 28 extends to an operating deck 32 which separates the lower compartment 33 containing the steam generating apparatus from an upper compartment 34. The operating deck 32 also serves to provide additional support for the steam generators 24.

The containment structure 10 may thus be seen to be generally divided into three compartments: the lower compartment 33, an upper compartment 34, and an annular condenser compartment 35. The condenser compartment 35 contains a quantity of solid material 36 having a relatively large heat of fusion, such as ice, divided so as not to prohibit a fluid from flowing therethrough. The solid material 36 desirably has the property of melting without substantial vaporization at a temperature lower than the condensation temperature of the condensible portion of any escaping fluid, such as steam, which may communicate with the material 36. Cooling coils and refrigeration means (not shown) may be provided when necessary for maintaining the solid material in its solid state. In order to minimize refrigeration costs, two sets of pressure actuated doors; upper doors 38 and lower doors 40 are situated respectively leading to the upper compartment 34 and from the lower compartment 33. The doors, 38 and 40, may be hinged and/or constructed in such a way that a small differential pressure will cause them to open such as by rupturing. In this example, the lower or ingress doors 40 are hinged along their upper edges and swing upwardly and into the condenser compartment 35 when the pressure reaches a predetermined level in compartment 33. The upper or egress doors 38 are hinged along their lower edges and swing downwardly and into the upper compartment 34 when the pressure in the condenser compartment 35 reaches a predetermined level. The doors 38 and 40 may be insulated and when closed may be viewed as an integral part of the secondary shield 20.

Situated beneath the solid material 36 and within the condenser compartment 35 of the containment system of this invention is a diffuser means, generally designated by the numeral 42. The function of the diffuser 42 is to insure that vertical sections of the solid materials, such as ice, are not overloaded and channeled by escaping reactor coolant, which normally is steam and hot water. For this purpose, the diffuser 42 is divided by partial length vertical walls 44 into a plurality of liquid trap valves 45. Liquid holding containers or basins 46 are formed which have a bottom wall or generally annular floor 48. Generally one basin 46 is provided for each ingress or lower door 40; although more or fewer may be provided. Extending into the basins 46 is a separator wall 50. The wall 50 is affixed to and supported by a baffle wall 52 extending at an obtuse angle downwardly from the secondary shield 20 just above the doors 40 so as to direct escaping fluids into the basins 46. The baffle wall 52 and the separator wall 50 insure that all the steam entering through any door 40 will proceed into the associated basin 46. The separator wall 50 may be viewed as separating each container or basin 46 into two sections. Wall 50 does not extend to the floor 48 thereby providing free flow of fluids between the sections. Alternately the separator wall 50 may extend to and be supported by the floor 48 and an opening may be provided therein to allow fluids to flow between the sections.

The structure is essentially configured as a generally U-shaped channel the bight of which acts as the basin to accumulate the water resulting from the melting of sections of ice.

It may be noted with reference to FIG. 2 that the diffuser 42 need not extend entirely around the containment 10. It is only necessary that a sufficient volume of fluid condensing material 36 be provided for a maximum credible accident, and this can be accomplished by properly sizing the generally annular region shown. Further, an access channel 54 is provided to aid in transporting nuclear fuel to and from the reactor vessel 22.

During periods of normal operation, the condenser compartment 35 remains closed and essentially sealed and insulated from the other compartments 33 and 34 by means of the doors 38 and 40. The liquid trap valves 45 are maintained essentially free of liquid by the fact that the solid material is not melted or if necessary the refrigeration means provided for the solid beds will maintain the solid state.

In the event of a loss of coolant accident, for example, a rupture of a primary coolant conduit 28 just at the top of the well 18, the high temperature coolant, which is pressurized water in this example, flows from the rupture into the well 18. A substantial amount of the pressurized water will quickly flash into steam. The steam then fills the entire lower compartment 33 escaping to the exterior of the well 18 and the primary shield 28 for example through the openings for the conduits 27. As the steam accumulates in the lower compartment 33, a pressure is built up in the lower compartment 33 which produces a differential pressure between the lower compartment 33 and the condenser compartment 35. The build-up of a small amount of differential pressure, for example one-half p.s.i., across a door 40 is sufficient in this example to open the lower doors 40. Because of the impossibility of constructing doors 40 which are identical in every respect and because the differential pressure which forces steam into each section of the condenser compartment cannot be expected to be identical at all pertinent times certain sections of the condenser compartment will receive their rated load of steam before others. For purposes of explanation, it is assumed the door 40 at the left of FIG. 1 opens before the doors 40 at the right of FIG. 1. The result is that the steam will flow through the liquid trap valve 45 associated with the door 40 and the condensible portions thereof will be condensed. Without the provision of water trap valve 45, a sufficient amount of steam might escape to cause a channel to form through an entire vertical section of solid material which would result in an amount of steam flowing without appreciable condensation to the upper compartment 34 and perhaps causing over-pressure conditions to exist. However, in accordance with this invention, as the steam condenses, the liquid resulting from the melting solid and the condensed steam is caught by the underlying basins 46 of the liquid trap valves 45.

Figure 3:
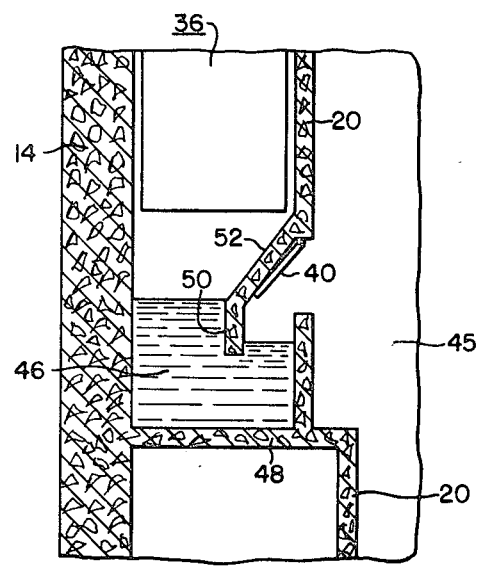
FIG. 3 shows a liquid trap valve in its closed position.

Referring to FIG. 3, the liquid trap valve 45 at the left in FIG. 1 is shown wherein a rated amount of steam has closed-off a section of solid material. The liquid is collected in the basin 46 of each liquid trap valve 45 until it reaches the level of the vertical separator wall 50 or alterntaively covers the opening in the separator wall 50. At this point, the pressure of the incoming steam is insufficient to overcome the static head developed, as shown in FIG. 3. Before sufficient pressure can accumulate in the lower compartment 33 to overcome the head in this liquid trap valve 45, the pressure in compartment 33 reaches a sufficient level to cause steam to flow to other sections of the condenser compartment which have not yet received their rated loads and consequently have unfilled water traps. This sequence is repeated with additional vertical sections being exposed to steam until all the liquid trap valves 45 receive their rated amount of steam and are closed. Each liquid trap valve 45 can thus be seen to operate without moving parts to insure that not vertical section of ice receives more than its rated amount of steam.

It should be noted that any non-condensible gases present will flow to the top of the pressure suppression compartment 35 and will open the upper doors 38. These gases then flow into the upper compartment 34 which serves as a storage space. However, a relatively small amount of such gases are present and there is no danger of their causing an over-pressure condition to exist.

In the event that steam is still being generated after all the water trap valves 45 have closed, the pressure can only build to a level sufficient to overcome the static head of water in the valves 45. The steam will then bubble through the water and into the remaining ice being condensed in its passage therethrough. Additional liquid from the melting ice accumulates in basins 46 and spills into compartment 33 from which it is allowed to drain into well 18.

It will therefore be apparent that there has been shown and described a new and improved pressure suppressing arrangement for a containment for a nuclear steam generating system having means for more adequately handling escaping gases which means have no moving parts.

While there have been shown and described what are at present the preferred embodiments of the invention, modifications thereto will readily occur to those skilled in the art. It is not, therefore, desired that the specific illustrative arrangement be limitative of the invention, but it is rather desired that the appended claims cover all such modifications as fall within the scope of the invention.

We claim as our invention:

1. A pressure suppressing arrangement for pressurized fluid handling apparatus, including a nuclear reactor therein, from which a pressurized expansible fluid may escape comprising:
   (a) a sealed containment totally enclosing the apparatus;
   (b) at least two normally closed compartments within said containment;
   (c) a body of normally solid material disposed within each said compartment, said normally solid material having the property of melting without substantial vaporization at a temperature lower than the condensation temperature of the condensible portion of the escaping fluid;
   (d) means for substantially directing the expansible fluid into said compartments, said last mentioned means at least partially defining flow paths for the fluid, to said compartments;
   (e) first means along each of said flow paths, said means having a normally closed configuration prohibiting access of fluids to said compartment and an open configuration responsive to a predetermined pressure differential established by the escape of the pressurized fluid; and
   (f) second means along each of said flow paths being situated generally beneath said solid material and having a normally open configuration allowing access of fluids to said solid material when said first means is in its open configuration, said second means assuming a closed configuration responsive to the melting of a predetermined amount of solid material.

2. The pressure suppressing arrangement of claim 1 wherein said second means comprises a generally U-shaped channel, and one leg of said U-shaped channel is situate to receive the melted portion of said solid material.

3. The pressure suppressing arrangement of claim 1 wherein said second means comprises a generally U-shaped channel, and the bight of the U-shaped channel is situated to receive and accumulate the melted portion of the solid material whereby the second means assumes its closed configuration when the bight and any portion of a leg have melted material therein.

4. The pressure suppressing arrangement of claim 3 including a plurality of compartments and wherein said first means include a plurality of closed doors, at least one of said doors assuming its open configuration when said predetermined pressure differential is established thereacross, and at least one additional door assuming its open configuration when said second means cooperating with said open door assumes its closed configuration.

5. The pressure suppressing arrangement of claim 3 wherein said normally solid material comprises ice.

References Cited

UNITED STATES PATENTS

| | | | |
|---|---|---|---|
| 3,115,450 | 12/1963 | Schanz | 176—38 |
| 3,158,546 | 11/1964 | Cordova | 176—37 |
| 3,232,843 | 2/1966 | Went et al. | 176—37 |
| 3,423,286 | 1/1969 | Weems et al. | 176—37 |

FOREIGN PATENTS

| | | | |
|---|---|---|---|
| 1,100,625 | 1/1968 | Great Britain. | 176—38 |

CARL D. QUARFORTH, Primary Examiner

H. E. BEHREND, Assistant Examiner

U.S. Cl. X.R.

137—253